United States Patent
Cho et al.

(10) Patent No.: US 9,656,693 B2
(45) Date of Patent: May 23, 2017

(54) STRUCTURE FOR FASTENING STIFFENING BAR AND METHOD FOR THE SAME

(71) Applicant: HYUNDAI MOTOR COMPANY, Seoul (KR)

(72) Inventors: Sung Hoon Cho, Bucheon-si (KR); Seong Wook Seo, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/726,409

(22) Filed: May 29, 2015

(65) Prior Publication Data

US 2016/0144897 A1    May 26, 2016

(30) Foreign Application Priority Data

Nov. 21, 2014   (KR) ......................... 10-2014-0163782

(51) Int. Cl.
*B62D 21/08*    (2006.01)
*B62D 65/02*    (2006.01)
(Continued)

(52) U.S. Cl.
CPC ........... *B62D 21/08* (2013.01); *B62D 21/155* (2013.01); *B62D 25/2018* (2013.01); *B62D 25/2072* (2013.01); *B62D 65/02* (2013.01)

(58) Field of Classification Search
CPC ........ B62D 21/00; B62D 21/02; B62D 21/08; B62D 21/11; B62D 21/15; B62D 21/155;
(Continued)

(56) References Cited

U.S. PATENT DOCUMENTS 5,074,587 A * 12/1991  Schwede ................ B62D 21/10
                                                        180/311
6,206,460 B1 * 3/2001  Seeliger ................ B62D 21/00
                                                        188/267
(Continued)

FOREIGN PATENT DOCUMENTS

DE   102011100325 A1 * 11/2012   ............ B62D 21/11
JP       4345422 B2    10/2009
(Continued)

OTHER PUBLICATIONS

English Translation of DE 10 2011 100 325; retreived Feb. 22, 2016 via PatentTranslate located at www.epo.org.*

(Continued)

*Primary Examiner* — Jason S Daniels
(74) *Attorney, Agent, or Firm* — McDermott Will & Emery LLP (57) ABSTRACT

A structure for fastening a stiffening bar includes a floor panel covering a bottom side of a vehicle body. A sub-frame is mounted on the floor panel and extends in a width direction of the vehicle body. A pair of center side members are mounted to the sub-frame and extend longitudinally at both sides of the bottom side of the vehicle body. A pair of rear side members extend longitudinally below the pair of center side members. The stiffening bar is mounted to the pair of rear side members so that a bottom side of the stiffening bar is higher than bottom sides of the pair of rear side members.

13 Claims, 5 Drawing Sheets

(51) Int. Cl.
*B62D 21/15* (2006.01)
*B62D 25/20* (2006.01)

(58) Field of Classification Search
CPC  B62D 25/20; B62D 25/2009; B62D 25/2018;
B62D 65/02
USPC .......... 296/187.08, 187.09, 193.07, 204;
280/124.109; 180/312
See application file for complete search history.

(56) References Cited

U.S. PATENT DOCUMENTS

| | | | | |
|---|---|---|---|---|
| 7,905,503 B2* | 3/2011 | Goto | ............... | B62D 25/087 |
| | | | | 280/124.109 |
| 8,585,132 B2* | 11/2013 | Klimek | ............... | B60K 1/04 |
| | | | | 296/187.08 |
| 9,067,627 B2* | 6/2015 | Hara | ............... | B62D 21/152 |
| 2010/0187864 A1* | 7/2010 | Tsuchida | ............ | B62D 25/20 |
| | | | | 296/193.07 |
| 2010/0301637 A1* | 12/2010 | Matsuura | ........... | B62D 25/087 |
| | | | | 296/204 |

FOREIGN PATENT DOCUMENTS

| | | |
|---|---|---|
| JP | 2011-148421 A | 8/2011 |
| JP | 5109124 B2 | 12/2012 |
| KR | 20-1999-006862 U | 8/1997 |

OTHER PUBLICATIONS

English translation of DE 10 2011 100 325; retreived Sep. 20, 2016 via PatentTranslate located at www.epo.org.*

English translation of KR 20-1999-006862; retreived Sep. 20, 2016 from Korea INtellectual Property Rights Information Service located at http://eng.kipris.or.kr/enghome/main.jsp.*

* cited by examiner

STRUCTURE FOR FASTENING STIFFENING BAR AND METHOD FOR THE SAME

CROSS-REFERENCE TO RELATED APPLICATION

This application claims the benefit of priority to Korean Patent Application No. 10-2014-0163782 filed in the Korean Intellectual Property Office on Nov. 21, 2014, the entire content of which is incorporated herein by reference.

TECHNICAL FIELD

The present disclosure relates to a structure for fastening a stiffening bar and a method for the same. More particularly, the present disclosure relates to a structure for fastening an automotive stiffening bar through a rear side member, and a method for assembling the stiffening bar.

BACKGROUND

A vehicle comprises a muffler, a suspension system such as a sub-frame, and a propeller shaft are mounted beneath a vehicle body, so air turbulence may be caused. Accordingly, a bottom side of the vehicle body is covered with a floor panel to secure stability in high-speed driving by reducing air resistance and drag generation.

A sub-frame that is a member of a suspension system and a center side member and a rear side member that are elongated longitudinally along a vehicle may be mounted on the floor panel to attenuate shock due to a collision and secure torsional stiffness.

A stiffening bar for securing frame rigidity of the vehicle body by combining with the sub-frame and the rear side member may be mounted on the lowermost portion of the vehicle.

Since the stiffening bar is mounted on the lowermost portion of the vehicle body in the related art, there are limitations in thickness and shape of the stiffening bar. Further, since the stiffening bar should be combined with the lowermost portion of the vehicle body when the sub-frame is coupled to another part of the vehicle body, it is difficult to achieve strong coupling.

The above information disclosed in this Background section is only for enhancement of understanding of the background of the disclosure, and therefore, it may contain information that does not form the prior art that is already known in this country to a person of ordinary skill in the art.

SUMMARY

The present disclosure has been made in an effort to increase strength for coupling a stiffening bar and a vehicle body by installing the stiffening bar through a rear side member and fastening a bracket to the stiffening bar.

According to an exemplary embodiment of the present inventive concept, a structure for fastening a stiffening bar includes a floor panel covering a bottom side of a vehicle body. A sub-frame is mounted on the floor panel and extending in a width direction of the vehicle body. A pair of center side members are mounted to the sub-frame and extend longitudinally at both sides of the bottom side of the vehicle body. A pair of rear side members extend longitudinally below the pair of center side members. The stiffening bar is mounted to the pair of rear side members so that a bottom side of the stiffening bar is higher than bottom sides of the pair of rear side members.

The stiffening bar may be further coupled to the sub-frame or the pair of center side members.

The stiffening bar may penetrate through the pair of rear side members.

Each of the pair of rear side members includes a coupling portion for coupling the stiffening bar thereto. The coupling portion may have a penetration hole formed at both sides of the coupling portion, through which the stiffening bar penetrates, and a work hole formed at a bottom side of the coupling portion.

A fixing bracket may be mounted inside the coupling portion. The outer sides of the fixing bracket may be attached to the inner sides of the coupling portion, and a bottom side of the fixing bracket may be in contact with a top side of the stiffening bar. A bracket hole may be formed at the bottom of the fixing bracket.

The stiffening bar may include a bolt hole, which corresponds to the bracket hole, formed at both ends of the third member for bolting the stiffening bar with the fixing bracket.

According to another exemplary embodiment of the present inventive concept, a method for fastening a stiffening bar, in which a pair of center side members are mounted to a sub-frame and extend longitudinally at both sides of a bottom side of a vehicle body; a pair of rear side members extend longitudinally below the pair of center side members and include a coupling portion at which the pair of rear side members and the stiffening bar are coupled to each other; and the stiffening bar is mounted to the pair of rear side member, the method may include drilling the coupling portion to form a hole at both sides thereof; inserting and fixing a fixing bracket to the coupling portions; inserting the stiffening bar through the hole; and mounting the coupling portion and the stiffening bar to the bottom of the vehicle body.

The method may further include coupling the stiffening bar to the pair of center side members.

DETAILED DESCRIPTION

In the following detailed description, only certain exemplary embodiments of the present inventive concept have been shown and described, simply by way of illustration. As those skilled in the art would realize, the described embodiments may be modified in various different ways, all without departing from the spirit or scope of the present disclosure.

Throughout the specification, unless explicitly described to the contrary, the word "comprise" and variations such as "comprises" or "comprising" will be understood to imply the inclusion of stated elements but not the exclusion of any other elements.

Like reference numerals are given to the same or like components throughout the specification.

An exemplary embodiment of the present inventive concept will hereinafter be described in detail with reference to the accompanying drawings.

Figure 1:
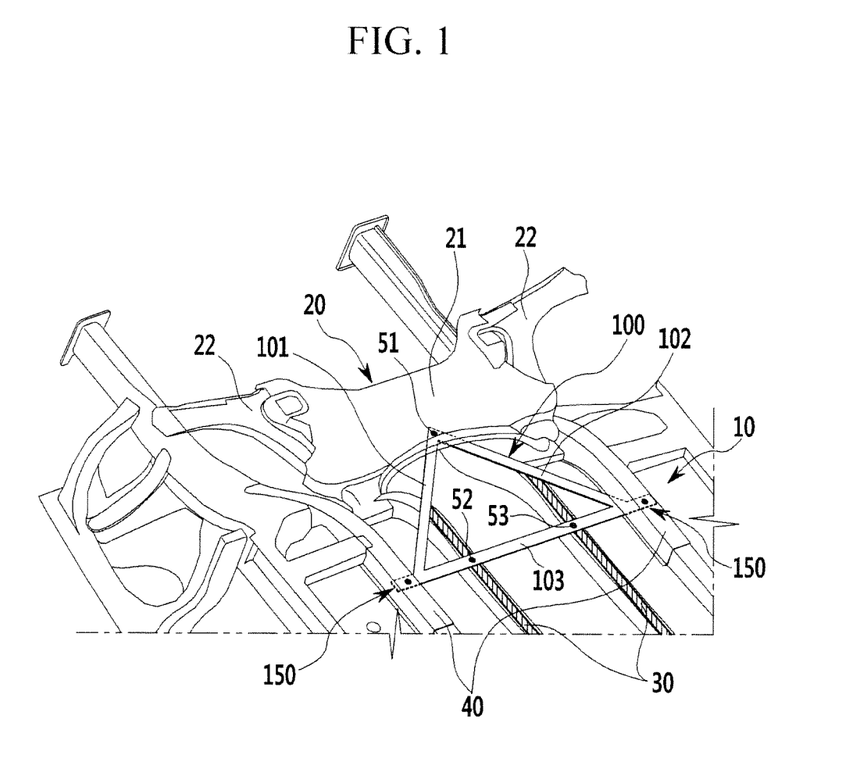
FIG. 1 is a perspective view of a structure for fastening a stiffening bar according to an exemplary embodiment of the present inventive concept.
Figure 2:
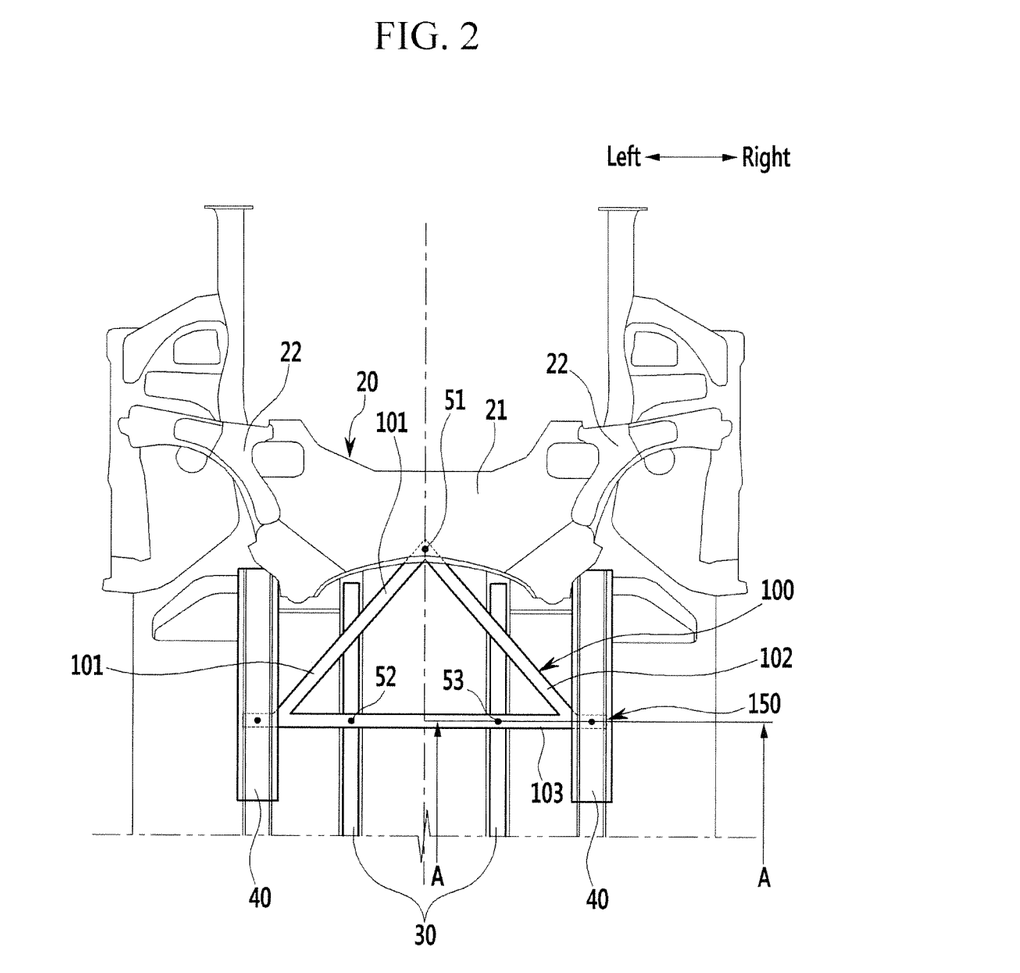
FIG. 2 is a front view of the structure for fastening a stiffening bar according to the exemplary embodiment of the present inventive concept.
Figure 3:
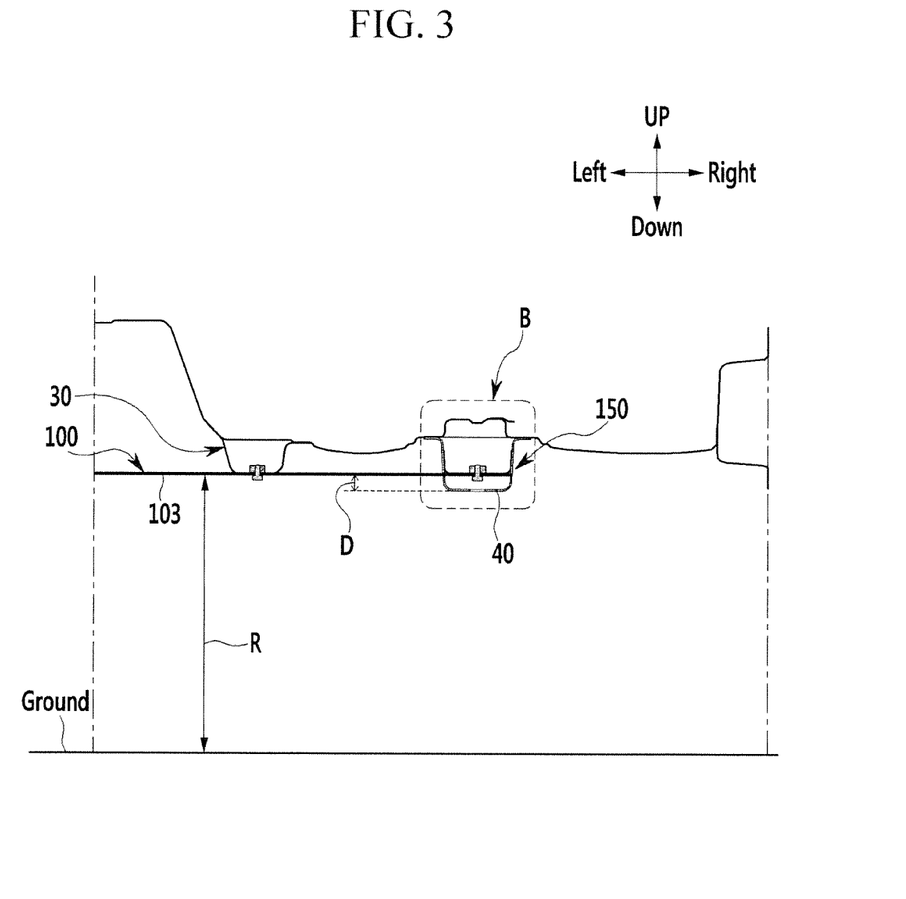
FIG. 3 is a cross-sectional view taken along line A-A in FIG. 2.
Figure 4:
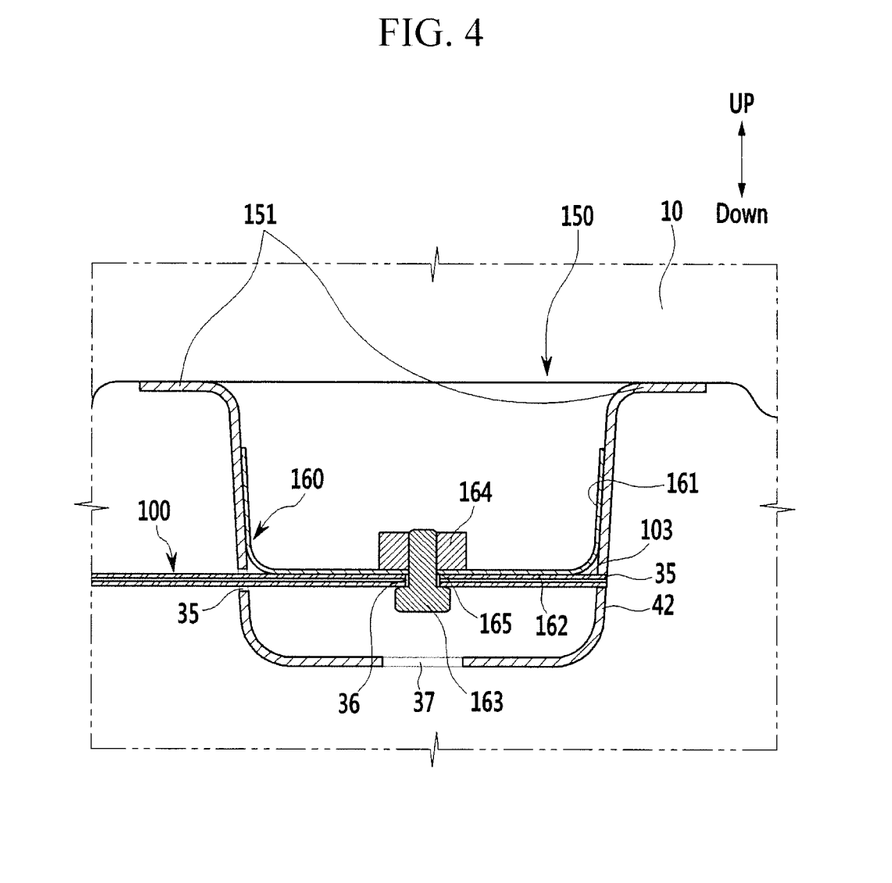
FIG. 4 is an enlarged view of the portion B of FIG. 3, showing a cross-section of the stiffening bar having a bracket therein according to an exemplary embodiment of the present inventive concept.

FIG. 1 is a perspective view of a structure for fastening a stiffening bar according to an exemplary embodiment of the present inventive concept. FIG. 2 is a front view of the structure for fastening a stiffening bar according to an is exemplary embodiment of the present inventive concept. FIG. 3 is a cross-sectional view taken along line A-A in FIG. 2. FIG. 4 is an enlarged view of the portion B of FIG. 3, showing a cross-section of the stiffening bar having a bracket therein according to an exemplary embodiment of the present inventive concept.

As shown in FIGS. 1 and 2, a structure for fastening a stiffening bar according to an exemplary embodiment of the present inventive concept includes a floor panel 10, a sub-frame 20, a pair of center side members 30, a pair of rear side members 40, and a stiffening bar 100.

The floor panel 10 is mounted on a bottom side of a vehicle body, and prevents resistance due to air flow and increases stability of the vehicle body. The sub-frame 20, the pair of center side members 30, the pair of rear side members 40, and the stiffening bar 100 may be mounted on the floor panel 10.

The sub-frame 20 supports a suspension system (not shown), an engine, etc. The sub-frame 20 includes a main body 21 and a sub-body 22. The main body 21 has a shape available for all kinds of vehicles. The sub-bodies 22 are independently mounted in accordance with the kinds of vehicles and mounted at both ends of the main body 21. An inner end of each of the sub-bodies 22 is coupled to the main body 21, and an outer end is coupled to the floor panel 10.

Center side members 30 are disposed at both sides on the bottom side of the vehicle, extend longitudinally along the vehicle body, and coupled to the sub-frames 20. The cross-section of the center side members 30 has a hollow rectangular shape.

The rear side members 40 are disposed outside the center side members 30 and extend longitudinally. The rear side members 40 may be connected to each other by a plurality of cross members (not shown).

A coupling portion 150, on which the stiffening bar 100 is fitted, is formed at a predetermined portion of each of the rear side members 40.

The cross-section of the rear side members 40 has a hollow rectangular shape. Bottoms of the rear side members 40 may be positioned at a predetermined distance D under the bottoms of the center side members 30.

FIGS. 3 and 4 show the coupling portion 150.

As shown in FIGS. 3 and 4, the coupling portion 150 has penetration holes 35, a work hole 37, and contact surfaces 151. The penetration holes 35 are formed through both sides of the coupling portion 150 and may have a shape corresponding to that of the stiffening bar 100. Accordingly, the stiffening bar 100 may be fitted in the penetration holes 35. Since the work hole 37 is formed through a bottom side of the coupling portion 150, it is easy to combine the stiffening bar 100 with a fixing bracket 160 by the work hole 37. The contact surfaces 151 bend in a width direction to both sides at a top side of the coupling portion 150, and the coupling portion 150 can be adhered to the floor panel 10 by the contact surfaces 151.

The fixing bracket 160 is mounted inside the coupling portion 150. The fixing bracket 160 may have a U-shape, but is not limited thereto.

The fixing bracket 160 has fixing bracket sides 161 and a fixing bracket bottom 162. The fixing bracket sides 161 may be coupled to inner sides of the coupling portion 150 by welding. The fixing bracket sides 161 can be coupled to the inner sides of the coupling portion 150 by spot welding without drilling a hole, but the present disclosure is not limited thereto. Accordingly, the fixing bracket 160 and the coupling portion 150 can be firmly combined.

The fixing bracket body 162 is in contact with a top side of the stiffening bar 100, and a bracket hole 165 is formed at a portion of the fixing bracket bottom 162. The stiffening bar 100 and the fixing bracket 160 can be combined by a bolt 163 and a welding nut 164 through the bracket hole 165. As the fixing bracket 160 is fixed to the stiffening bar 100, the stiffening bar 100 can be firmly retained inside the rear side member 40.

The stiffening bar 100 is coupled to the sub-frame 20, the center side members 30, and the rear side members 40 on the bottom side of the vehicle body, thus increasing stiffness of the rear side of the vehicle body. The stiffening bar 100 has a first member 101, a second member 102, and a third member 103, and may have a triangular shape, but it is not limited thereto. The first, second, and third members 101, 102, and 103 may have a rod shape.

The first member 101 has a first end connected to a first end of the third member 103 and a second end connected to a center 51 of the sub-frame 20.

The second member 102 has a first end connected to a second end of the third member 103 and a second end connected to the center 51 of the sub-frame 20. The second ends of the first member 101 and the second member 102 may meet each other at the center 51 of the sub-frame, and may be fixed to the center 51 of the sub-frame by a bolt or by welding.

The third member 103 extends in the width direction of the vehicle and is disposed through both rear side members 40. The third member 103 may be fastened to the fixing bracket 160 by the bolt 163 and the welding nut 164, but is not limited thereto. A bolt hole 36 is formed at a position which corresponds to the bracket hole 165 of the third member 103 to combine the third member 103 and the fixing bracket 160. Both ends of the third member 103 extend outward further than the first ends of the first and second members 101 and 102, and extensions may be inserted in the rear side members 40.

As described above, since the first member 101, the second member 102, and the third member 103 are integrally formed, the stiffening bar 100 is stronger.

As shown in FIG. 3, since the third member 103 is inserted through the rear side members 40, the bottom of the third member 103 may be positioned at a distance D over the rear side member 40. The distance may be 25 mm, but is not limited thereto. Although the stiffening bars are installed at the lowermost portion of vehicle bodies in the related art, the stiffening bar 100 according to an exemplary embodiment of the present inventive concept may be positioned a little upward by the distance D, so that ground clearance R increases by the distance D.

Since the third member 103 is positioned at the distance D over the bottom side of the rear side member 40, the third member 103 and the bottom of the center side member 30 may be at the same height. Accordingly, contact points 52 and 53 may be defined between the third member 103 and the center side member 30. The third member 103 may be fixed to the center side members 30 by bolts or by welding at the contact points 52 and 53. The third member 103 is additionally coupled to the center side members 30 in addition to is the rear side members 40, and thus, coupling strength between the stiffening bar 100 and the floor panel 10 increases.

According to an exemplary embodiment of the present inventive concept, the stiffening bar 100 is fixed to the rear side members 40 such that it is positioned at the distance D over the bottoms of the rear side members 40. Accordingly, the stiffening bar 100 is inserted through the rear side members 40 and fixed to the fixing bracket 160 fixed to the rear side members 40. A method of assembling the stiffening bar is described in detail with reference to FIG. 5.

Figure 5:
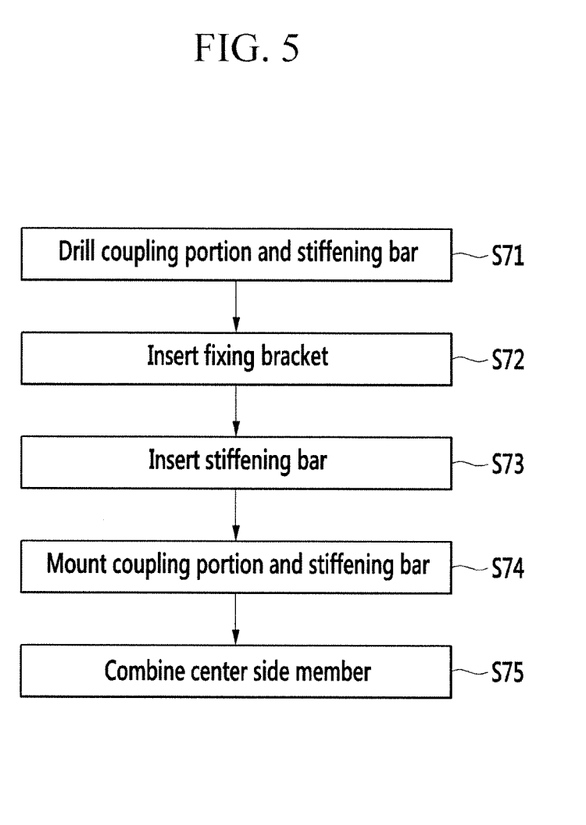
FIG. 5 is a flowchart illustrating a method of assembling a stiffening bar according to an exemplary embodiment of the present inventive concept.

FIG. 5 is a flowchart illustrating a method of assembling a stiffening bar according to an exemplary embodiment of the present inventive concept.

A method of assembling the stiffening bar 100 according to an exemplary embodiment of the present inventive concept includes drilling the coupling portion 150 and the stiffening bar 100 (S71). That is, a hole corresponding to the shape of the stiffening bar 100 is formed at both sides of the coupling portion 150 so that the stiffening bar 100 can be inserted into them. The work hole 37 for fastening the stiffening bar 100 inside the coupling portion 150 may be formed through a bottom of the coupling portion 150.

The fixing bracket 160 is fixed to the coupling portion 150 (S72). That is, the fixing bracket 160 is inserted inside the coupling portion 150, and the fixing bracket sides 161 are welded to the inner sides of the coupling portion 150.

Thereafter, the stiffening bar 100 is inserted into holes at both sides of the coupling portion 150. When the stiffening bar 100 is inserted, the stiffening is bar 100 is fixed to the fixing bracket with a bolt through the work hole 37 (S73).

Next, the rear side members 40 with the coupling portions 150 and the stiffening bar 100 are mounted on the bottom of the vehicle body (S74).

Further, the stiffening bar 100 may be coupled to the bottoms of the center side members 30 by bolts or by welding (S75).

As described above, according to an exemplary embodiment of the present inventive concept, as the stiffening bar 100 is disposed through the rear side members 40, the stiffening bar 100 can be firmly coupled to the vehicle body, so the frame stiffness and torsional stiffness of the vehicle body be sufficiently reinforced. Further, the stiffening bar 100 does not need to be installed at the lowermost portion of the vehicle body, so the ground clearance is increased.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A structure for fastening a stiffening bar, comprising:
   a floor panel covering a bottom side of a vehicle body;
   a sub-frame mounted on the floor panel and extending in a width direction of the vehicle body;
   a pair of center side members mounted to the sub-frame and extending longitudinally at both sides of the bottom side of the vehicle body; and
   a pair of rear side members extending longitudinally below the pair of center side members,
   wherein the stiffening bar is mounted to the pair of rear side members so that a bottom side of the stiffening bar is higher than bottom sides of the pair of rear side members, and
   wherein the stiffening bar penetrates through the pair of rear side members,
   wherein each of the pair of rear side members includes a coupling portion for coupling the stiffening bar thereto, and
   wherein the coupling portion has a penetration hole formed at both sides of the coupling portion, through which the stiffening bar penetrates, and a work hole formed at a bottom side of the coupling portion.

2. The structure of claim 1, wherein the stiffening bar is coupled to the sub-frame.

3. The structure of claim 1, wherein the coupling portion further includes a fixing bracket mounted therein, and
   the fixing bracket has outer sides thereof attached to inner sides of the coupling portion and a bottom side thereof is in contact with a top side of the stiffening bar.

4. The structure of claim 3, wherein the fixing bracket comprises a bracket hole formed at the bottom side of the fixing bracket.

5. The structure of claim 4, wherein the stiffening bar further includes a bolt hole, which corresponds to the bracket hole, formed at both ends of the third member for bolting the stiffening bar with the fixing bracket.

6. The structure of claim 3, wherein the stiffening bar includes a first member, a second member, and a third member, and
   wherein the first member has a first end connected to a first end of the third member and a second end connected to the sub-frame, the second member has a first end connected to a second end of the third member and a second end connected to the sub-frame, and the third member extends in the width direction of the vehicle body and has both ends coupled to the pair of rear side members.

7. The structure of claim 6, wherein the first member, the second member, and the third member are integrally formed.

8. The structure of claim 6, wherein third member is fixed to the pair of center side members.

9. The structure of claim 1, wherein the stiffening bar is coupled to the pair of center side members.

10. The structure of claim 1, wherein the sub-frame includes:
    a main body; and
    sub-bodies having an inner end coupled to the main body and an outer end coupled to the floor panel.

11. A method for fastening a stiffening bar, in which a pair of center side members are mounted to a sub-frame and extend longitudinally at both sides of a bottom side of a vehicle body; a pair of rear side members extend longitudinally below the pair of center side members and include a coupling portion at which the pair of rear side members and the stiffening bar are coupled to each other; and the stiffening bar is mounted to the pair of rear side members, the method comprising steps of:
    drilling holes through lateral sides of the coupling portion;
    inserting and fixing a fixing bracket to the coupling portion;
    inserting the stiffening bar through the holes; and
    mounting the coupling portion and the stiffening bar to the bottom side of the vehicle body,
    wherein a work hole is formed at a bottom side of the coupling portion such that the work of fixing the stiffening bar to the fixing bracket with a bolt after inserting the stiffening bar is performed through the work hole.

12. The method of claim 11, further comprising coupling the stiffening bar to the pair of center side members.

13. The method of claim 11, wherein the stiffening bar is mounted to the pair of rear side members so that a bottom side of the stiffening bar is higher than bottom sides of the pair of rear side members.

* * * * *